United States Patent
Novoa et al.

[19]

[11] Patent Number: 5,925,131
[45] Date of Patent: *Jul. 20, 1999

[54] COMPUTER AND COMPUTER NETWORK HAVING A POWER DOWN INHIBIT

[75] Inventors: Manuel Novoa, Houston; Robert S. Brayton, Tomball, both of Tex.

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/699,555

[22] Filed: Aug. 19, 1996

[51] Int. Cl.[6] ............................................ G06F 1/00
[52] U.S. Cl. ........................... 713/300; 709/208; 709/217
[58] Field of Search ................... 395/750.01–750.08, 395/200.38–200.41, 200.47–200.49

[56] References Cited

U.S. PATENT DOCUMENTS

| | | | |
|---|---|---|---|
| 5,432,946 | 7/1995 | Allard et al. | 395/750 |
| 5,548,763 | 8/1996 | Combs et al. | 395/750 |
| 5,560,021 | 9/1996 | Vook et al. | 395/750 |
| 5,594,426 | 1/1997 | Ushijima et al. | 340/825.02 |
| 5,692,197 | 11/1997 | Narad et al. | 395/750 |

*Primary Examiner*—Glenn A. Auve
*Assistant Examiner*—Jigar Pancholi
*Attorney, Agent, or Firm*—Jenkens & Gilchrist

[57] ABSTRACT

The present invention relates to a computer network having a host computer and a plurality of user computers connected to the host computer by a computer network wherein the host computer can send a signal to inhibit any or all the user computers from completely powering down. More particularly, the present invention relates to a computer that can be inhibited from powering down when a user presses a power button. The computer may enter a standby state instead of powering down. Furthermore, the computer may inform the user that it is going to go into a standby state at a predetermined event after a power down inhibit signal is received from a host computer.

17 Claims, 6 Drawing Sheets

COMPUTER AND COMPUTER NETWORK HAVING A POWER DOWN INHIBIT

BACKGROUND OF THE INVENTION

1. Technical Field of the Invention

The present invention relates to a computer network having a host computer and a plurality of user computers connected to the host computer wherein the host computer can inhibit any or all the user computers from completely powering down. More particularly, the present invention relates to a host computer connected to a plurality of user computers via a network or LAN system wherein the host system inhibits the user computers from completely powering down and thereby allows the host computer to access the user computers, presumably when the users are not using the user computers, and then service or upgrade the user computers.

2. Description of Related Art

Presently, network or LAN systems are used to connect multiple users of personal computers together in the workplace. These networks are generally maintained by a network administrator. The network administrator has a variety of tasks. One of the tasks of the network administrator is to upgrade the software and operating systems of all the user computers associated with the network. The network administrator can upgrade user computers only when they are turned on and connected to the network or LAN system. Furthermore, the upgrades take place whether or not the user is using his or her computer. Thus, the best time for a network administrator to service a user's computer is when the user has gone home for the evening or when the user is not using the computer. A problem is that many users turn off their computers prior to leaving their office, or the user is using the computer while it is being upgraded and data is lost.

A network administrator would have to go to each office and turn on all the terminals or make sure all the users are not using their computers prior to servicing the user computers.

Presently, Hewlett Packard ("HP") has introduced a system for use by a network administrator that sends a signal to a user computer, while turned on, and prevents the user computer from being turned off. The user can depress or switch the power switch on the computer chassis, but the computer will not turn off. After the user leaves for the evening, the computer is still on and therefore, the network administrator can upgrade or service the user computer. A subsequent signal, sent after the upgrade or service is complete, permits the user's terminal to turn off.

The HP system has drawbacks and disadvantages. The HP system is considered a "dumb" system. That is, it does not provide for feedback from the user. The HP system only provides an ON-OFF feature. The ON-OFF feature either disallows or allows a user computer to be turned off. The user does not know whether his computer can be turned off until he tries to turn it off. Furthermore, if the user were to leave the power switch on the computer set to the off position when the ON-OFF feature is remotely set to be ON, then later, when the feature is remotely reset to the off position, the computer will immediately power down. As a result, the computer may power down during a time when the user is using his computer and thereby cause a loss of whatever the user is working on.

More particularly, the HP system may operate satisfactorily when operating in a DOS environment, but when utilizing advanced operating systems, such as Windows 95, NT, and UNIX, the user could shut down the user's operating system and circumvent the network administrators ability to service the network efficiently.

Thus, there is a need for a system for use by a network administrator that informs the users on the network that their computers cannot be completely powered down and that provides the users with the ability to indicate whether they wish to participate in the service or upgrade that is being provided to the user computers on the network.

SUMMARY OF THE INVENTION

The present invention relates to a computer network having a host computer and a plurality of user computers connected to the host computer wherein the host computer can send a signal to inhibit any or all the user computers from completely powering down. More particularly, the present invention relates to a computer that can be inhibited from powering down when a user presses a power button. The computer may enter a standby state instead of powering down. Furthermore, the computer may inform the user that it is going to go into a standby state at a predetermined event after a power down inhibit signal is received from a host computer.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION OF A PRESENTLY PREFERRED EXEMPLARY EMBODIMENT

Figure 1:
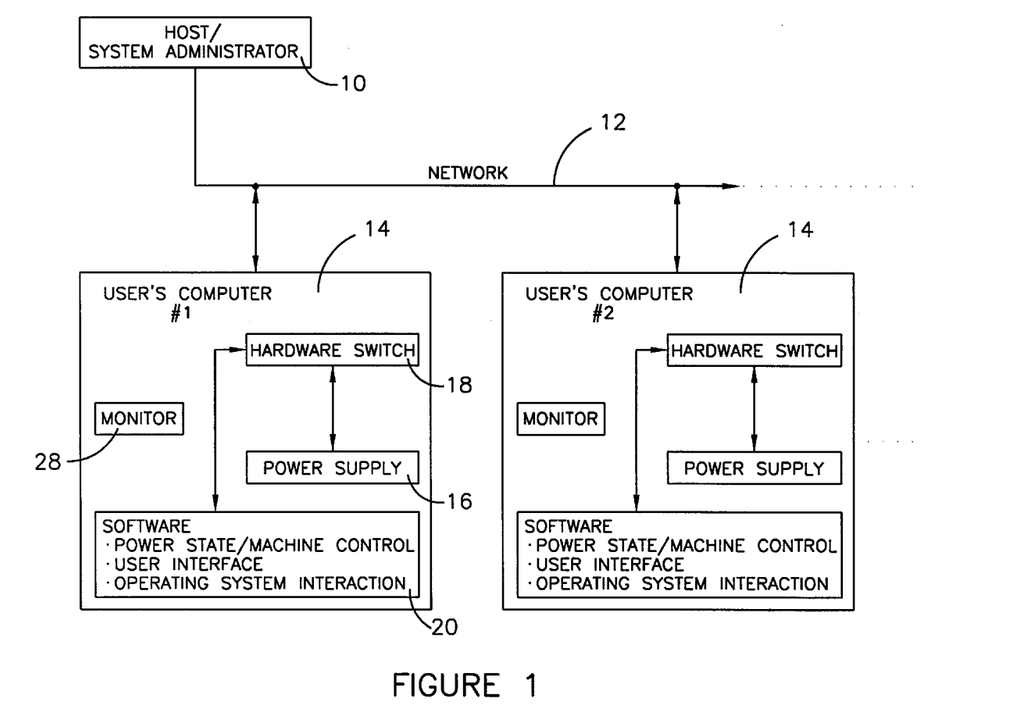
FIG. 1 is system level block diagram of an exemplary embodiment of the present inhibit power down system.

FIG. 1 depicts a host computer or system administrator computer 10. A system administrator operates the host computer 10. The system administrator is generally responsible for the upkeep of the network and all the user computers 14 connected to the network. From the system administrator computer 10 the system administrator can control the specific workings of the network 12 and the user computers 14. For example, the system administrator can upload or download software or data to and from the host computer 10 and the user computers 14.

In the preferred exemplary embodiment of the present computer system there is a power down inhibit capability which can inhibit a user computer from powering down. In the preferred embodiment, a user computer 14 comprises a power supply 16 for powering the user computer components. The power supply 16 can comprise a transformer, a battery pack, or any other power source for the user computer 14. The power supply 16 can have the capability to provide power to the user computer 14 in three modes of operation: full power mode, low power mode, and off.

The power supply 16 is controlled by a hardware switch 18. The hardware switch 18 is connected to the network 12 and also communicates with software 20 installed in the user computer 14. The hardware switch 18 also includes a power button (not shown) on the outside of the user computer 14 which the user presses to turn the power of the user computer on and off.

Figure 2:
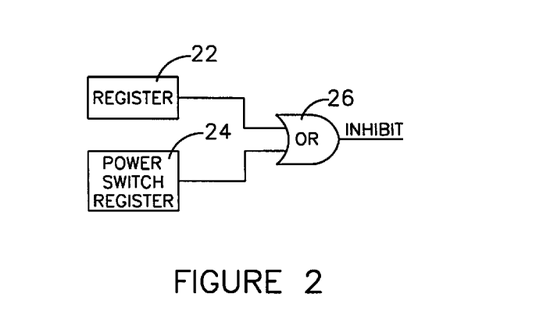
FIG. 2 is a simplified diagram of a portion of an exemplary hardware switch.

FIG. 2 depicts a simplified diagram of an exemplary register found in the hardware switch 18. There is a register 22 which receives an inhibit signal from the host computer via the network 12 and another register 24 connected to the power button. Whenever the inhibit bit is set in the first register the output of the OR gate 26 will inhibit the power supply from turning off. The power supply will only be able to turn off if the inhibit bit is not set and the power switch is set to turn the computer off.

Referring back to FIG. 1, the software 20 within the user monitor communicates with the hardware switch 18. The software 20 provides, among other things, an operating system for interaction between the network 12 and the user computer 14, a means for user interface, and control over the power state of the user computer 14. When the user computer 14 is placed in a standby state, the power supply 16 can be switched to a low power state.

Ideally, the user computer 14 will have a power button (a momentary push button), a power indicator light, a power supply, a monitor, a disk drive, an operating system and software. A purpose of the exemplary invention is to allow a host computer 10 to interact with user computers 14 connected to a network 12 so that the host computer 10 can disable any or all of the user computers 14 from being turned off. The user computers 14 can be placed in a standby state wherein the operating system is not completely shut down and/or can be awakened by the host computer 10 via the network 12 at a later time. The host computer 10 can send a power down inhibit signal to the user computers 14 on the network 12. Any user computer 14 that is on or in a standby state will receive the power down inhibit signal. The power down inhibit signal is received by the circuitry within the hardware switch and communicated to the software. The software 20 informs the user, via the monitor 28, that the system administrator is requesting or requiring that the user computer 14 cannot be completely powered down.

When the user depresses the power switch to turn the user computer off and when the power down inhibit is enabled, the user computer may appear to be turned off to the user because the monitor 28, power indicator lights, cooling fan, and disk drive(s) will turn off, but the operating system will still be operational enough to receive a power up signal from the host computer 10 via the network 12.

If the user computer 14 is already in a low power or standby state and a power inhibit signal is received by the user computer 14, then the inhibit is stored to a register within the user computer 14 so that the system administrator can, via the network 12, power up the user computer 14 at a later time.

Once the user computer 14 is in the standby state it can be awakened by a signal from the host computer 10. If the user computer 14 is being used by a user when the host computer attempts to service the user computer, then a query window will be displayed on the user computer's monitor 28. Preferably, the query window will explain to the user that the system will be serviced at a particular time and that the user has a few options. The options can vary, but could be to power down the computer into a standby state now, to not participate in the maintenance service and remain operational to the user, or to completely power down and not participate with the maintenance service. Of course, a system administrator may want different options available to the user depending on the computer network and the necessity of the system maintenance.

A reason for inhibiting a user computer 14 from powering down is so that a system administrator can upgrade the software on the user computers 14. In order for the software to be downloaded to the user computer 14, the user computer's operating system 20 must be operational. That is, the user computer must be on or in a standby state that can be awakened into an on state. By sending a power down inhibit signal to the user computers 14, the user computers are stopped from turning off. The user computer goes into a standby state wherein the operating system is still operational enough to be awakened by the host computer 10.

If the user computer 14 is on when the power inhibit signal is received by the user computer, the software will send a message to the monitor 28 for the user to read. The message can provide the user options. That is, the user can decide whether she wants to participate in the upcoming upgrades or not.

In the exemplary user computer 14, the power button and power indicator light on the user computer do not necessarily directly indicate whether the power is on in the user computer 14 in the traditional sense. The power button is preferably a momentary push button. The power button and power indicator states are shown below:

| Inhibit Bit | Power Status | Power Indicator | Power Button Action |
|---|---|---|---|
| Enabled | ON | ON | Transition to STANDBY |
| Enabled | OFF | OFF | N/A |
| Enabled | STANDBY | BLINK | Transition PS to ON |
| Disabled | ON | ON | Transition PS to OFF |
| Disabled | OFF | OFF | Transition PS to ON |
| Disabled | STANDBY | BLINK | Transition PS to ON |

When the inhibit bit is enabled and the power supply is on, the power button transitions the operating system to standby. At this time, the user may get a query display asking the user if she wishes to allow the system to service the software in the user computer. It is understood that the inhibit can be set by other means besides a "bit"; the inhibit can in fact be set by any signal transmitted over a network designated as an inhibit signal.

The Power Status column shows three states: ON, OFF and STANDBY. ON and OFF work as one would expect. The STANDBY state preferably spins down the hard drive (s), and powers down energy conserving monitors. Non-energy conserving monitors are given a blank screen. The power indicator light should preferably blink on and off in the STANDBY state, but the power indicator light may be OFF in certain applications of the present invention. The blinking may be necessary to indicate to the user not to unplug the user computer.

Figure 3:
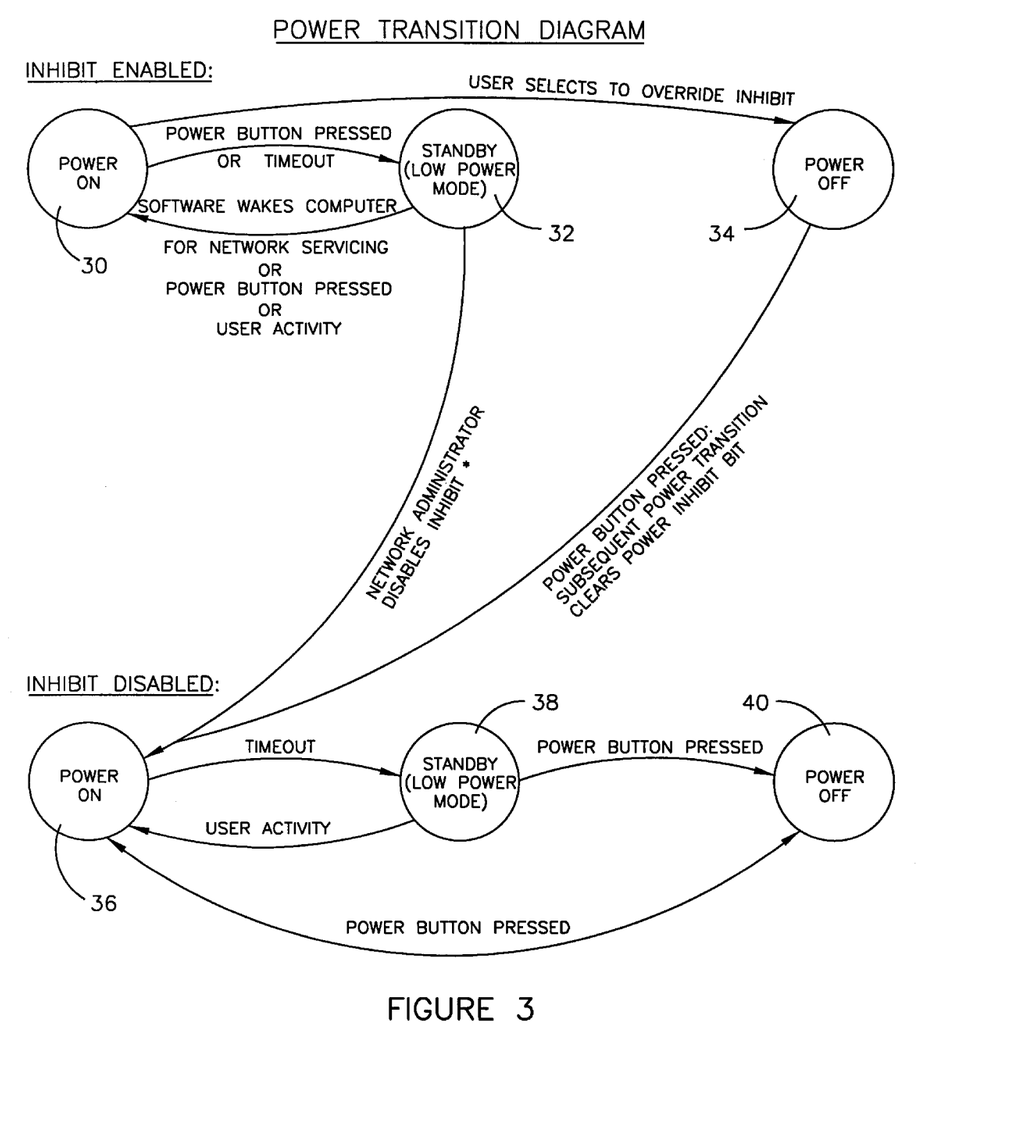
FIG. 3 is a state diagram of the transitions of the exemplary embodiment of the present inhibit power down system.

FIG. 3 depicts a Power Transition State Diagram of the preferred user computer. The upper portion of the diagram indicates the various possible states of the user computer when the power down inhibit bit is enabled. The lower portion of the state diagram indicates the various states the user computer can have when the power down inhibit bit is disabled. Each circle indicates a state of the user computer. The arrow lines between circles indicate an event that occurs in order for the user computer 14 to change states.

Starting at inhibit enabled, power on 30, the user computer 14 is powered up and has received a power down inhibit signal from the host computer 10. The user can select, via a query window on the monitor, to override the inhibit signal. Once the inhibit signal is overridden the user can depress the power button and the user computer will power completely down and go to the off state 34. Once in the off state 34, the power button can be depressed again to cycle the user computer to the on state with the power inhibit disabled 36.

Looking again at the power on, inhibit enabled state 30, if the user presses the power button or the user computer times out (due to lack of use by the user), the user computer will go to the standby state 32. When in standby state, the user computer will preferably spin down the disks, power down or blank the screen of the monitor, turn off the cooling fan and set the power supply in a low power mode. The operating system will remain at least partially functional in order to power up the user computer if (a) the host computer requests that the user computer be powered up via a power up signal provided over the network, (b) the power button is pressed, or (c) there is user activity such as a pressing of a keyboard button. If a, b, or c occurs the user computer will change the user computer state to power on 30. It is understood that if the user computer is placed in the standby state 32 because the user pressed the power button, then user activity may not be enough to change the state of the user computer to the power on state 30.

Alternatively, if the user computer is in the inhibit enabled, standby state 32, the host computer can send an inhibit disable signal to the user computer via the network. When the user computer receives the inhibit disable signal, the state of the user computer changes from the standby state 32 to the power on state 36 wherein the inhibit bit is disabled. (In actuality the user computer's state will probably have to change from standby state 32, to power on state 30, then to the power on state 36.)

If the user computer is in the power on state, inhibit disabled 36, the user computer can be toggled between power on, inhibit enabled 30 and power on, inhibit disabled 36 by the host computer sending the appropriate inhibit enable/disable signal to the user computer via the network.

When in the power on, inhibit disabled state 36, the user computer can change to the standby state 38 when the user computer times out (i.e., when there is no activity on the user computer for a predetermined amount of time). The user computer will preferably turn off or blank the monitor, spin down the disk drive(s), turn off the cooling fan, and set the power supply in a low power mode when the user computer is in the standby state 38. The operating system software will be functional enough to wake up the computer without having to reboot the system in the standby state 38. If the user presses any button on the user computer or maneuvers any peripheral, such as a joy stick or a mouse, the user computer will change state to the power on state 36.

Of course, if the power button is pushed when the user computer is in the power off state 40 or the power on state 36, the user computer will toggle between the two states.

Also, if the user computer is in the standby state 38 and the power button is pressed the user computer will go to the power off state 40.

Figure 4:
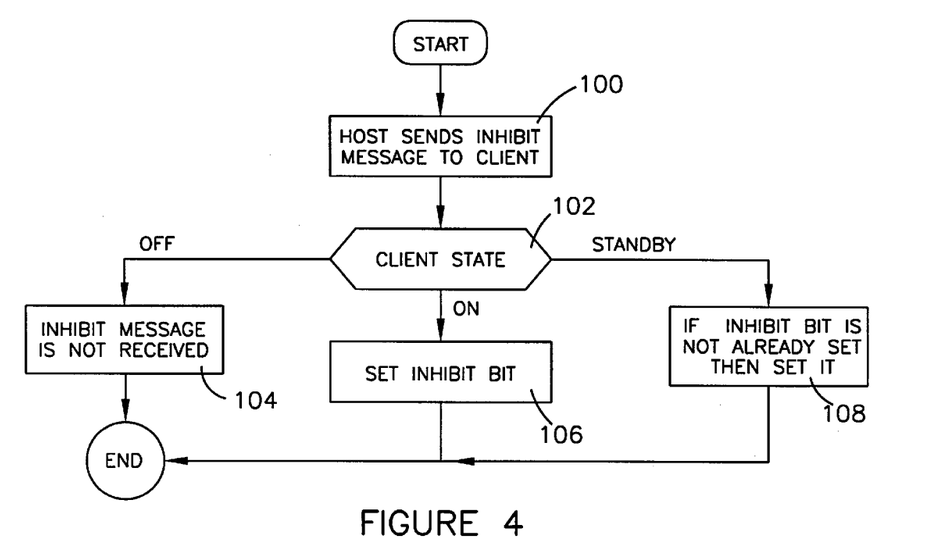
FIG. 4 depicts a flow chart of the preferred occurrences that occur when an inhibit power down signal is received.

The workings of the preferred exemplary computer system having a power down inhibit feature is described in the flow charts shown in FIGS. 4 through 8. Referring first to FIG. 4, the host computer may send a set inhibit power down message over the network 100. A "client" or user computer on the network receives the set inhibit power down message and reacts to the message depending on the state of the client computer 102. If the client computer is OFF, then the power down inhibit message is not received 104. If the client computer is ON, then the power down inhibit message is received and the client computer is inhibited from completely powering down when the power button is pressed 106. If the client computer is in a standby state, then the inhibit bit is set if it has not already been set. That is, if the inhibit bit was already set and the power button was pressed to place the client computer in the power down state, then the inhibit bit remains set 108.

Figure 4A:
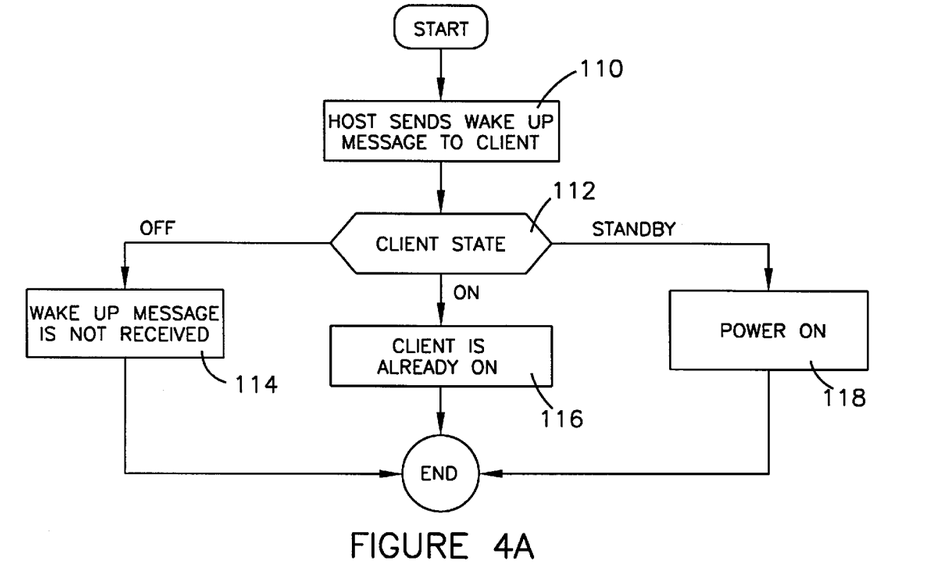
FIG. 4A depicts a flow chart of the preferred occurrences that occur when a wake up message is received by a user computer.

FIG. 4A depicts what occurs when a host computer sends a wake-up signal to a client computer so that the host computer can service the client computer. Here the host computer sends a wake-up signal to the client computer 110. The client computer receives the wake-up signal and responds to the signal depending on the state of the client computer 112. If the client computer is OFF, then the wake-up message is not received 114. If the client computer is ON then the wake up message is received, but the client computer is already ON. In the circumstance wherein the client computer is already on, the client computer may place a query window on the client computer's monitor. The query window may inform the user that the system administrator is about to service the client computer and may request that the user either stop using the computer for a period of time, that the user request to not participate in the upgrades of the system, etc.

If the client computer is in a standby state, then when the client computer is "awakened" by the wake-up signal, the client computer will spin up the disk drive(s), turn on the monitor, set the power supply to full power, and enable the operating system to be completely operational 118 so that the system administrator can service the client computer.

Figure 5:
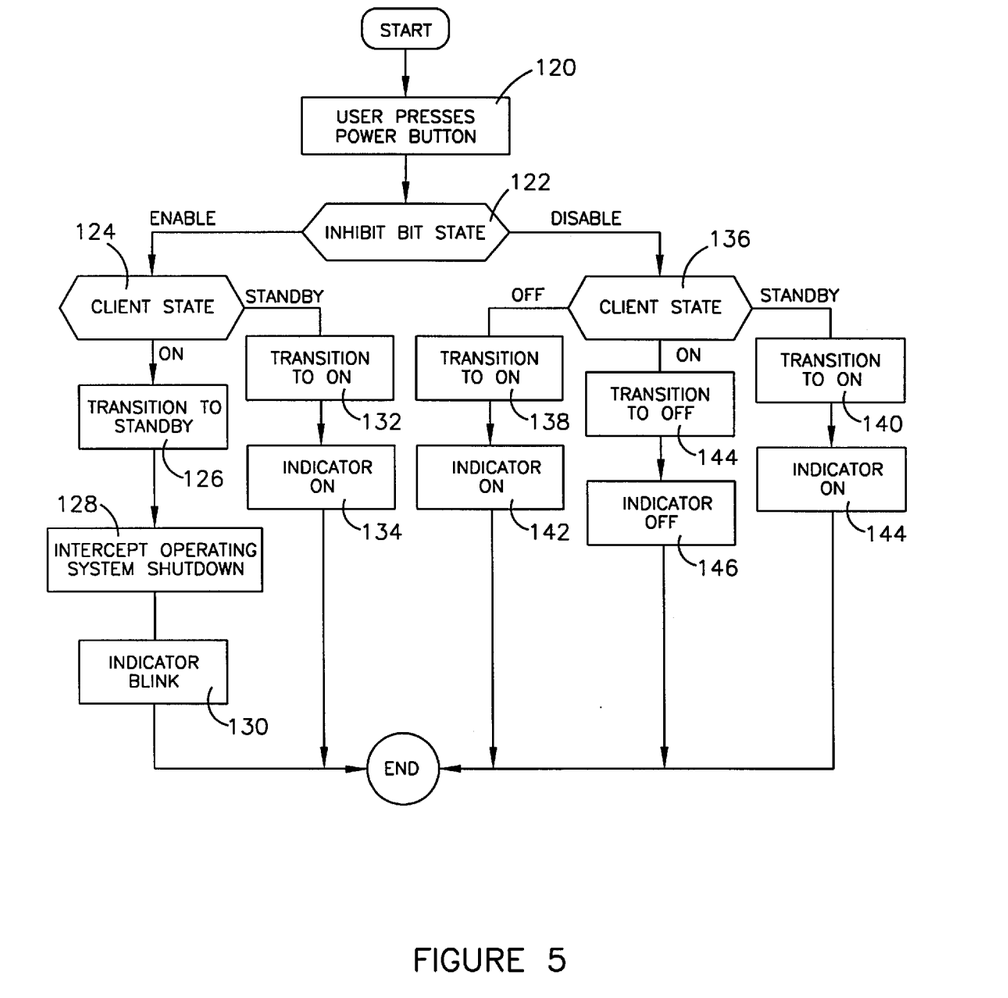
FIG. 5 depicts a flow chart of the preferred possible occurrences that occur when a user presses a power button on a user computer.

FIG. 5 depicts the possible results of a user pressing a power button on a client computer. Here the user presses the power button 120. The client computer will react differently to the pressing of the power button depending on the state of the inhibit bit 122.

If the inhibit bit is enabled, then the client computer state determines the client computer's response to the pressing of the power button 124. If the client computer state is ON, then the client computer transitions to STANDBY 126 and the operating system is stopped from completely shutting down 128. Also, the power indicator light may be set to blink thereby indicating that the computer is not completely OFF, but instead is in standby mode 130.

If the client computer is in standby mode, then the client computer will transition to the ON state 132 and the power indicator will indicate that the computer is ON 134. Note that when the inhibit bit is enabled in the client computer that it is not possible for the client computer to go to the OFF state when the user presses the power button.

Referring back to the block 122, wherein the state of the inhibit bit is determined, if the inhibit bit is determined to be disabled, then the state of the client computer determines the outcome from pressing the power button 136. If the client computer is either in a STANDBY state or an OFF state, the client computer will transition to the ON state 136, 140 and the indicator light will indicate that the power is ON 142, 144. If the state of the client computer is ON, then the client computer transitions to the OFF state and the indicator light is turned OFF 146.

Figure 6:
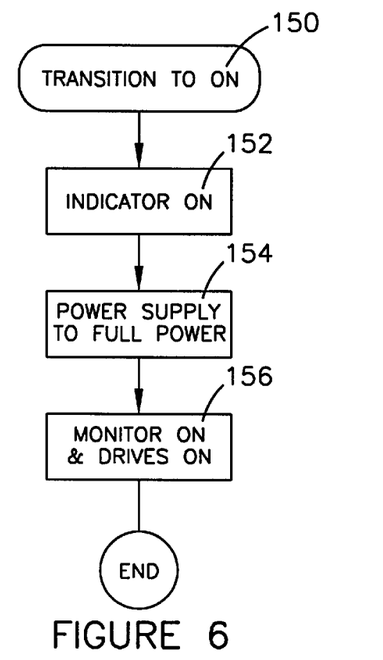
FIG. 6 depicts a flow chart of the preferred occurrences that occur when a user computer transitions to the ON state.
Figure 7:
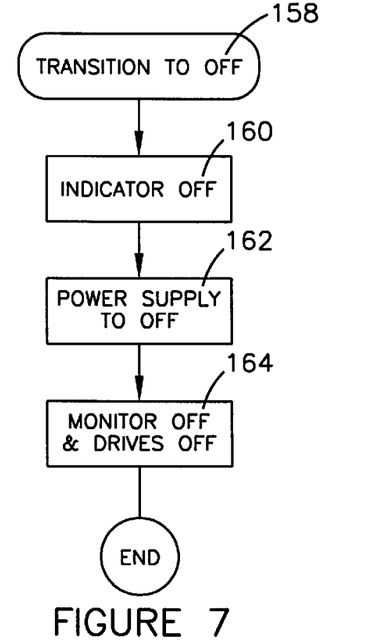
FIG. 7 depicts a flow chart of the preferred occurrences that occur when a user computer transitions to an OFF state.
Figure 8:
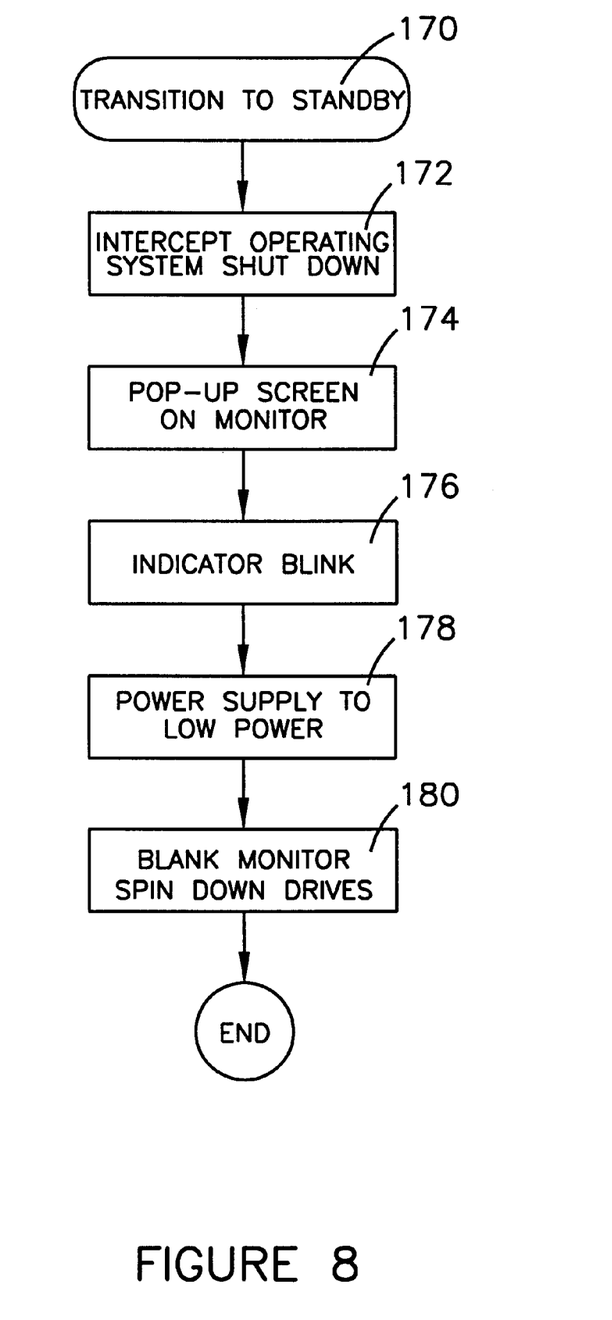
FIG. 8 depicts a flow chart of the preferred occurrences that occur when a user computer transitions to a STANDBY state.

FIGS. 6, 7 and 8 depict what occurs in a user computer when it transitions to a state such as ON, OFF or STANDBY. FIG. 6 depicts what occurs when a user computer transitions to ON 150. When the user computer transitions to ON, the indicator light indicates that the user computer is in the ON state 152, the power supply is turned to full power 154, and the monitor and disk drive(s) are turned on 156.

FIG. 7 depicts what occurs when a user computer transitions to the OFF state 158. When the user computer transitions to the OFF state the indication light is turned OFF to indicate that the computer is OFF 160; the power supply is turned OFF 162 and the monitor and drive(s) are turned off 164.

FIG. 8 depicts what preferably occurs when the user computer transitions to standby when the power down inhibit bit is set and the power button is pressed 170. When the user computer transitions to standby the operating system is disallowed from shutting down 172. A pop-up screen may appear on the monitor querying the user as to whether she will allow the user computer to be part of a system servicing by the system administrator 174. The indicator light may blink on and off to indicate that the user computer is in a standby, low power state 176. Furthermore, the power supply, if so equipped, can be set into a low power state so that only enough power is supplied to the user computer componentry to keep the operating system operating 178. The monitor will be either blanked or powered down depending on the type of monitor and the disk drive(s) will be turned off 180.

The present user computer with a power down inhibit feature provides various advantages. First, the user computer may provide user feedback thereby indicating to the user of the computer that the system administrator has set the computer power down inhibit feature so that the computer cannot be turned off and can be serviced or upgraded at a later time when the user is not using the user computer. When the user computer is inhibited from powering down and the user presses the power button, the user may be informed that the computer is being placed in a low power mode so that it can be serviced later on in time. At a later time the system administrator can remotely power up the computer via a host computer and a network and service or upgrade the user computer. When the servicing is complete, the inhibit power down bit can be disabled and the user computer will be able to be turned off.

The power down inhibit is not a "blind feature" wherein the user has no idea that her system is going to be serviced or changed in some way while she is not using it. Instead, the user is made aware when the computer is going to be serviced. Also, the user computer can be controlled, to some extent, remotely by the system administrator. The system administrator can set all the computers on a network to be inhibited from powering down when a user attempts to turn them off. The user computers are left in a standby state, instead of being allowed to turn off, that can be changed to a full power state by the host system administrator. Such a feature allows a system administrator to easily upgrade a networked system while the user computers are not being used by the users.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A computer adapted to be connected to a computer network, comprising:
    software adapted to allow said computer to be placed in a standby state;
    a power switch; and
    a hardware switch, electrically responsive to said power switch, for receiving an inhibit power down signal from said computer network, said combination of said hardware switch and said software are adapted to place said computer in a standby state after said inhibit power down signal is received from said computer network and said power switch is pressed, said software being further able to respond to a powerup signal from said computer network so that a system administrator can operate said computer via said computer network.

2. The computer of claim 1, wherein said software is adapted to inform a user that the computer has received said inhibit power down signal.

3. The computer of claim 1, further comprising a monitor wherein said monitor enables said software to inform a user that said computer has received said inhibit power down signal.

4. The computer of claim 1, wherein pressing said power switch sends a signal to said hardware switch to change states.

5. A method for controlling a computer comprising the steps of:
    receiving an inhibit power down signal via a network at said computer;
    determining whether said computer is in one of an off state, a standby state, and an on state;
    inhibiting said computer from completely powering down if said computer is in said on state;
    informing a user that said inhibit power down signal has been received; and
    placing said computer in a standby state when user attempts to put said computer in an off state; and p1 sending a powerup signal from a system administrator via said network to powerup said computer from said standby state.

6. The method of claim 5, further comprising the step of inhibiting said computer from completely powering down if said computer is in said standby state.

7. The method of claim 5, further comprising the step of placing said computer in a standby state, wherein said step of placing said computer in a standby state includes the steps of:
    powering down a disk drive;
    powering down a monitor; and
    circumventing an operating system from shutting down.

8. The method of claim 7, wherein said step of placing said computer in a standby state includes the step of setting a power supply into a low power supply mode.

9. A computer comprising:
    a power button having at least two states, including an on state and off state;
    means for receiving an inhibit power down signal from a network;
    means for indicating to a user that an inhibit power down signal has been received;

software means, responsive to a received inhibit power down signal and a state of said power button, for inhibiting said computer from being completely powered down and for placing said computer in a standby state when said user attempts to place said computer in an off state, said software means further enabling said computer to be powered up from said standby state when a powerup signal is received from said network.

10. The computer of claim 9, wherein said software means is responsive to a received power up signal from said network.

11. The computer of claim 9, wherein said software means is adapted to place said computer into a standby state when said inhibit power down signal has been received and said power button is placed in an off state.

12. The computer of claim 9, further comprising a power supply having at least a full power and a low power output capability.

13. The computer of claim 9, further comprising means for receiving an override signal from at least one of said network and said user to override said software means, said override signal enabling said computer to be completely powered down.

14. A computer having the ability to be placed in an on state, a standby state and an off state, comprising:

a power button having at least two states;

a means for receiving a power down inhibit signal, a disable power down inhibit signal, and a power up signal from a network;

a program, responsive to at least said receiving means and said power button, adapted to place said computer in a standby state after said computer has received a power down inhibit signal and said power button has changed states;

means for informing a user that said computer has received a power down inhibit signal and;

means for powering up said computer from said standby state via said powerup signal from said network after said powerdown inhibit signal has been received and said computer has been placed in a standby state by said power button.

15. The computer of claim 14, wherein an operating system is at least partially operational when said computer is in said standby state.

16. The computer of claim 15, wherein said computer consumes less energy in said standby state than when in said on state, and said computer comsumes more energy in said standby state than when in said off state.

17. The computer of claim 14, wherein said means for informing includes a monitor connected to said computer.

* * * * *